United States Patent [19]

Blanpied

[11] Patent Number: 5,001,005

[45] Date of Patent: Mar. 19, 1991

[54] STRUCTURAL LAMINATES MADE WITH NOVEL FACING SHEETS

[75] Inventor: Robert H. Blanpied, Meridian, Miss.

[73] Assignee: Atlas Roofing Corporation, Meridian, Miss.

[21] Appl. No.: 568,705

[22] Filed: Aug. 17, 1990

[51] Int. Cl.$^5$ ............................................... B32B 3/26
[52] U.S. Cl. .................................... 428/283; 428/285; 428/304.4; 428/319.1; 428/323; 428/324; 428/326; 428/328
[58] Field of Search ..................... 428/283, 285, 304.4, 428/319.1, 323, 324, 326, 328

[56] References Cited

U.S. PATENT DOCUMENTS

| | | | |
|---|---|---|---|
| 3,671,355 | 6/1972 | Paymal | 428/319.1 |
| 4,049,852 | 9/1977 | Smith, Jr. | 428/319.1 |
| 4,082,885 | 4/1978 | Rashid et al. | 428/283 |
| 4,459,334 | 7/1984 | Blanpied et al. | 428/319.1 |
| 4,600,634 | 7/1986 | Langer | 428/283 |

*Primary Examiner*—William J. Van Balen
*Attorney, Agent, or Firm*—Branigan & Butler Griffin

[57] ABSTRACT

A structural laminate comprises at least one planar facing sheet comprised largely of glass fibers but not having micro-glass as a filler. The facing sheet is self adhered to a rigid thermosetting plastic foam core. The non-glass filler material is chosen from a group consisting of clay, mica, talc, limestone (calcium carbonate), gypsum (calcium sulfate), aluminum trihydrate (ATH), antimony oxide, cellulose fibers, and plastic polymer fibers. The non-glass filler material improves containment of liquid plastic thermosetting polymer, and offers economic and safety advantages.

7 Claims, No Drawings

STRUCTURAL LAMINATES MADE WITH NOVEL FACING SHEETS

BACKGROUND

1. Field of Invention

This invention relates to laminates and foam filled panel products which are rigid and reasonably strong, and more particularly relates to structurally rigid boards of foam which have at least one planar flat side covered with a facing sheet.

2. Prior Art and Other Considerations

The field of foamed core laminated panels is large and well known in commerce. Over the years, flat rigid sheets and continuous webbed flexible sheets have been used to provide one or both facings ("facers") for a foamed core panel.

The facer sheets have been formed of paper, plastic, aluminum foil, other metals, rubber, wood, and even vegetable based skins. These facer sheets contain cellular plastic foam between two facers in parallel planes in a panel, and form a laminated "sandwich board" configuration.

One of the most successful facer panels has been made using a mat of 100% glass fibers. The glass fibers are bonded together with resin binders to form opposing facers for containing or sandwiching thermosetting plastic foam therebetween.

Another prior art practice has been to pre-attach fiberglass mat or skrim with paper, or plastic, or aluminum foil, or a combination of any two or three.

Glass mats have been saturated with asphaltic materials to form facers of reduced porosity. Multi-layered, pre-assembled, facing sheets of myriad components have also been employed by producers of structural foam core laminate panels.

For many years now, glass fibers having a diameter of 10 microns or less and usually less than 0.5 inches in length, called "micro-fibers" or "fibrous glass dust", have functioned as fillers in the production of glass fiber mats. The function of a "filler" in the manufacture of glass fiber mat sheets, is to decrease the porosity of the fibrous sheet. If the glass fiber sheet has a high porosity, it cannot be used as a facing sheet for thermosetting plastic foams, because the liquid polymer will not be contained by a porous glass fiber mat (sheet). Consequently, the makers of glass fibrous mats have resorted either to a multi-layered facer or to the use of micro-fibers as their best means to accomplish the necessary low porosity of their glass mat so it can be used as a facing material for thermosetting plastic foam laminated panels.

One major problem always confronting the panel users, and thus the producers, of foam core panels has been the safety factor. In recent years, scientists have classified "micro-fibers" as a serious hazard to human safety. These, short, thin glass fibers may ultimately be classified as a human carcinogen. In 1990, The American Conference of Governmental Industrial Hygienists (ACGIH) listed the Threshold Limit Value (TLV) of Fibrous Glass Dust to have a maximum Time Weighted Average (TWA) exposure of only 10 milligrams per cubic meter.

An additional area of safety hazard has been the combustibility of foam core laminated panels, especially when asphalt, plastic or cellulose are employed in making the facing sheets. Both metal facing sheets and glass fiber facing sheets offer some measure of fire safety, but both types have been quite expensive. The addition of hazardous glass micro-fibers has also added to the cost of glass fiber facing sheets.

Accordingly, it is an object of the present invention to provide a foam core laminated structural panel having safe and economical facers.

An advantage of the present invention is the provision of foam core laminated structural panels having relatively non-combustible facers.

Another advantage of the present invention is the provision of foam core laminated structural panels having facers which lack micro-fibers.

Yet another advantage of the present invention is the provision of a reduced porosity, predominately glass fiber facing sheet, devoid of micro-fibers or fibrous glass dust, and which prevents the penetration of liquid polymeric plastic foam mixtures.

Another advantage of the present invention is the provision of foam core laminated structural panels having facers which are smoother to the touch than a 100% glass mat.

Yet another advantage of the present invention is the provision of foam core laminated structural panels having facers which are economical and yet which combat combustibility and porosity while improving surface texture.

SUMMARY

Thermosetting plastic foam laminates of the invention comprise at least one planar facing sheet and a rigid foam integrally attached upon formation of the foam to a surface of a facing sheet. The rigid foam is formed from any thermosetting catalyzed plastic reaction product capable of being foamed.

The planar facing sheets includes (A) from 60% to 90% by weight glass fibers exclusive of glass micro-fibers, and (B) from 10% to 40% by weight non-glass filler material, and (C) from 1% to 30% by weight non-asphaltic binder material which bonds the fibers together and bonds the filler materials to the fibers.

The non-glass filler material is chosen from a group consisting of clay, mica, talc, limestone (calcium carbonate), gypsum (calcium sulfate), aluminum trihydrate (ATH), antimony oxide, cellulose fibers, and plastic polymer fibers. The non-glass filler material improves retention of liquid plastic thermosetting polymer, and offers economic and safety advantages.

DESCRIPTION OF THE INVENTION

All thermosetting foams of the present invention are all those plastic resins which can be blown into a cellular, foamed structure by any known blowing agent, and which become rigid solids by catalyzed reaction. All structural laminates of the present invention have a thermosetting plastic foam between two facers, at least one of which is a facer of the present invention. All embodiments of the facers of the present invention have ordinary glass fibers as their major component with an amount of a non-glass filler material making up between about 10% and about 40% of the total weight of the facer sheet. The filler materials of this invention are: clay, mica, talc, limestone (calcium carbonate), gypsum (calcium sulfate), aluminum trihydrate (ATH), antimony oxide, cellulose fibers, plastic polymer fibers, or a combination of any two or more of these substances, and are collectively and individually referred to herein as "fillers" or "filler materials". The term, "aluminum trihydrate", is a contraction of dried "aluminum trihydroxide", Al(OH)$_3$.

The fillers of this invention can be added to the mat either with the furnish going to a headbox of a forming machine, or they can be added to the binder resin which is usually applied via an on-line curtain coater, or they can be added to the glass mat in a subsequent operation after it is dried and wound up in rolls.

If used before the mat is dried and wound up in rolls, the filler materials of the present invention are bonded to the glass fibers either by binders such as urea-, phenol-, or melamine-formaldehyde resins (UF, PF, and MF resins), or a modified acrylic or polyester resin. If added in a subsequent operation, polymer latexes are used with or without dye coloring. The ordinary polymer latexes of this invention are, but are not limited to: Styrene-Butadiene-Rubber (SBR), Ethylene-Vinyl-Chloride (EVCl), PolyVinylidene Chloride (PVdC), modified PolyVinyl Chloride (PVC), PolyVinyl Alcohol (PVOH), and PolyVinyl Acetate (PVA). No asphalt is used as a binder in this invention.

Many, but not all, of the glass fiber mats of this invention are wet-formed into a continuous non-woven web of any workable width on a Fourdrinier machine. Preferably, an inclined wire such as Sandy Hill's "Delta Former" is used. These machines usually use a curtain coater prior to the dryer section to add the binder resin.

Facer Example No. 1

In the process of making a glass fiber mat, the furnish is made by eliminating the micro-fibers, and in their place substituting a cellulose fiber. The weight percent of cellulose fibers as a percent of all fibers is at least 10 percent. The fibers are bonded together by an ordinary prior art non-asphaltic binder resin referred to above.

Facer Example No. 2

In the process of making a glass mat for glass shingles, the glass fiber furnish is already without the hazardous micro-fibers. This "shingle mat" is suitable for being coated, or saturated, with asphalt type coatings/saturants, but it is not suitable as a facer for thermosetting plastic foam. The porosity of a shingle mat is too high to contain the liquid phase of any thermosetting plastic resin. The liquid resin which penetrates the porous shingle mat causes malfunction of the foam laminate processing equipment, shutting it down. Such a mat can be modified in a subsequent process to considerably reduce the liquid porosity of the mat. For example, a shingle mat is coated with a coating consisting of (dry solids basis), 90% limestone and 10% polymer latex. Any thermoplastic polymer latex can be used. A suitable coating is made by mixing one of these latex emulsions with water, a 325 mesh limestone, and a suitable thickener such as methyl ethyl cellulose (MEC) to a workable coating viscosity. A good range of coating viscosities is from 500 to 4000 cps (Brookfield @ RT).

Facer Example No. 3

Any one of the thermoplastic polymer latexes mentioned above is mixed with clay, talc, mica, or other mineral pigment filler, in ratios of from about 3-to-1 up to about 12-to-1 (dry solids basis of filler to binder), with additional water and a water thickener such as MEC, to form a suitable coating which reduces the porosity of shingle mat to the extent it can be used as a facer for thermosetting plastic foam boards.

Facer Example No. 4

In the glass web forming process of Facer Example No. 1, the cellulose fibers are eliminated and thermoplastic fibers are substituted therefor. Examples of such fibers are polyester, polyacrylic, nylon, polyethylene, polypropylene, and the like. Similar resin binders can be used, such as modified acrylic, modified polyester, UF, PF, or MF.

Facer Example No. 5

In the glass web forming process of Facer Example No. 2, the micro-fibers are left out, no additional fibers are added, and the resin binder does not have pigment filler. However, a glass mat with mineral pigment filler added to the resin binder can be made which reduces the porosity of the mat to an extent that it can be successfully used as a facer to a thermosetting plastic foam laminate. For example, a common urea-formaldehyde binder resin is mixed with talc, clay, mica, limestone, or ATH to form a thick binder which reduces the porosity of a glass mat not made with glass micro-fibers, cellulose fiber, or plastic fiber fillers.

Facer Example No. 6

In the glass web forming process of Facer Example No. 5, no fiber is used in the resin binder mix. However, a glass mat is made using fibers of cellulose or plastic mixed into the binder, which is generally added by a curtain coater. The fiber-binder resin mixture reduces the porosity of the glass web such that it makes a suitable facer for foam laminates.

Facer Example No. 7

A glass web is made using both mineral pigment fillers (exclusive of gypsum) and fibers of cellulose or plastic mixed with the binder resin applied at the curtain coater. Appropriate mixtures of fibers with pigments and with the thermosetting resin binders referred to above are made which are particularly cost effective in reducing the porosity of the predominately glass mat.

Facer Example No. 8

A glass web is made where the mineral pigment filler(s), as well as the cellulose or plastic fiber filler(s) are added to the stock coming to the headbox of the forming machine. The binder resin application at the curtain coater is either without any filler in it, or else it contains one or more of the fillers used in the present invention. Such a glass mat is made with sufficiently low porosity to be used as a facer for a thermosetting foam.

THERMOSETTING FOAM LAMINATES

All thermosetting plastic foam laminates of the present invention have at least one facing sheet made by the foregoing facer examples. Any prior art phenol-formaldehyde, polyurethane, or polyurethane modified polyisocyanurate foam can be used with one, or more, facers of the present invention to make a structural laminate of the instant invention. If such a structural laminate has only one facer of the present invention, the facer on the opposite broad face of the laminate can be any prior art facer. Examples of such prior art facers are: pure aluminum foil, multi-laminated sheets of foil-Kraft-foil or just one foil layer on Kraft paper, 100% glass fiber mat, aluminum foil glued to 100% glass fiber mat, cellulose felt, glass fiber modified cellulose felt, or asphalt coated glass mat.

It is obvious to one skilled in the art, that literally dozens of examples of suitable combinations of two similar facers of the present invention with various thermosetting foams can be made. Likewise, it is obvious that two dissimilar facers of the present invention can be used to make even more combinations of examples of suitable foam laminates of the instant invention. Furthermore, the skilled designer of such board laminates could conceive of literally thousands of combinations using just one facer of the present invention with a variety of thermosetting plastic foam formulae, and with a variety of just one prior art facer.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A thermosetting plastic foam laminate comprising:
   (1) at least one planar facing sheet comprising:
      (A) from 60% to 90% by weight glass fibers exclusive of glass micro-fibers, and
      (B) from 10% to 40% by weight non-glass filler material, and
      (C) from 1% to 30% by weight non-asphaltic binder material which bonds the fibers together and bonds the filler materials to the fibers;
   (2) a rigid foam integrally attached upon formation of the foam to the surface of a facing sheet, the rigid foam formed from a thermosetting catalyzed plastic reaction product capable of being foamed.

2. The thermosetting plastic foam laminate of claim 1 wherein there are two parallel facing sheets of the same composition.

3. The thermosetting plastic foam laminate of claim 1 wherein said non-glass filler material is chosen from a group consisting of clay, mica, talc, limestone (calcium carbonate), gypsum (calcium sulfate), aluminum trihydrate (ATH), antimony oxide, cellulose fibers, and plastic polymer fibers.

4. A method of making a thermosetting plastic foam laminate, said method comprising:
   binding a non-glass filler material to a mat of glass fibers which does not contain glass micro-fibers to form a planar facing sheet, whereby said planar facing sheet comprises from 60% to 90% by weight glass fibers and from 10% to 40% by weight non-glass filler material;
   attaching a rigid foam formed from a thermosetting catalyzed plastic reaction product capable of being foamed to said planar facing sheet upon formation of the foam.

5. The method of claim 4, wherein two parallel facing sheets of the same composition are attached to said rigid foam.

6. The method of 4, wherein said non-glass filler material is chosen from a group consisting of clay, mica, talc, limestone (calcium carbonate), gypsum (calcium sulfate), aluminum trihydrate (ATH), antimony oxide, cellulose fibers, and plastic polymer fibers.

7. The method of claim 6, wherein said binding is accomplished using from 1% to 30% by weight non-asphaltic binder material which bonds the fibers together and bonds the filler materials to the fibers.

* * * * *